US011763850B1

(12) United States Patent
Gustof et al.

(10) Patent No.: US 11,763,850 B1
(45) Date of Patent: Sep. 19, 2023

(54) SYSTEM AND METHOD FOR ELIMINATING BIAS IN SELECTIVELY EDITED VIDEO

(71) Applicant: MOTOROLA SOLUTIONS, INC., Chicago, IL (US)

(72) Inventors: Grzegorz Gustof, Myslenice (PL); Stefan Koprowski, Myslenice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/823,109

(22) Filed: Aug. 30, 2022

(51) Int. Cl.
    G11B 27/031    (2006.01)
    G06V 20/40     (2022.01)
    G06V 10/70     (2022.01)
    G06V 40/20     (2022.01)

(52) U.S. Cl.
    CPC .......... *G11B 27/031* (2013.01); *G06V 10/768* (2022.01); *G06V 20/43* (2022.01); *G06V 20/49* (2022.01); *G06V 40/20* (2022.01)

(58) Field of Classification Search
    None
    See application file for complete search history.

(56) References Cited

U.S. PATENT DOCUMENTS

| | | | |
|---|---|---|---|
| 8,412,657 B2* | 4/2013 | Grenier ............... | G06F 16/9535 706/18 |
| 9,570,107 B2 | 2/2017 | Boiman et al. | |
| 9,779,370 B2* | 10/2017 | Shen ...................... | G06Q 10/06 |
| 10,062,412 B2 | 8/2018 | Liu et al. | |
| 10,452,713 B2 | 10/2019 | Liu et al. | |
| 11,017,298 B2 | 5/2021 | Cormier et al. | |
| 2006/0197879 A1 | 9/2006 | Covell et al. | |
| 2009/0177670 A1* | 7/2009 | Grenier ............... | G06F 16/9535 |
| 2012/0158632 A1* | 6/2012 | Grenier .................. | G06F 16/35 706/45 |
| 2013/0282722 A1* | 10/2013 | Grenier ............... | G06F 16/9535 707/737 |
| 2015/0070506 A1* | 3/2015 | Chattopadhyay ...... | G06V 20/52 348/159 |
| 2016/0034914 A1* | 2/2016 | Gonen ............... | G06Q 30/0208 705/318 |
| 2018/0300557 A1 | 10/2018 | Rodenas et al. | |
| 2021/0071972 A1* | 3/2021 | Deng ...................... | G01S 19/34 |
| 2021/0118063 A1* | 4/2021 | Zhao .................... | H04N 21/266 |

FOREIGN PATENT DOCUMENTS

JP    5283732 B2    9/2013

* cited by examiner

*Primary Examiner* — Gelek W Topgyal

(57) ABSTRACT

Techniques for eliminating bias in selectively edited videos are provided. A request to release a video capturing a public safety incident is received. The video is edited to create an edited video. At least one civilian score and at least one public safety official score based on the sentiment of the video is computed. At least one edited civilian score and at least one edited public safety official score based on the sentiment of the video is computed. A first score is computed based on a combination of the civilian score and public safety official score. A second score is computed based on a combination of the edited civilian score and edited public safety official score. The first and second score are compared to determine if a difference between the scores exceed a threshold. The edited video is released when the scores do not exceed the threshold.

20 Claims, 5 Drawing Sheets

300

305 — RECEIVE A REQUEST TO RELEASE A VIDEO CAPTURING A PUBLIC SAFETY INCIDENT

310 — EDIT THE VIDEO TO CREATE AN EDITED VIDEO

315 — FOR AT LEAST ONE CIVILIAN CAPTURED IN THE VIDEO CAPTURING A PUBLIC SAFETY INCIDENT, COMPUTE A CIVILIAN SCORE, THE CIVILIAN SCORE BASED ON A SENTIMENT OF THE VIDEO CAPTURING THE PUBLIC SAFETY INCIDENT

320 — FOR AT LEAST ONE PUBLIC SAFETY OFFICIAL CAPTURED IN THE VIDEO CAPTURING A PUBLIC SAFETY INCIDENT, COMPUTE A PUBLIC SAFETY OFFICIAL SCORE, THE PUBLIC SAFETY OFFICIAL SCORE BASED ON A SENTIMENT OF THE VIDEO CAPTURING THE PUBLIC SAFETY INCIDENT

325 — FOR AT LEAST ONE CIVILIAN CAPTURED IN THE EDITED VIDEO, COMPUTE AN EDITED CIVILIAN SCORE, THE EDITED CIVILIAN SCORE BASED ON A SENTIMENT OF THE EDITED VIDEO

330 — FOR AT LEAST ONE PUBLIC SAFETY OFFICIAL CAPTURED IN THE EDITED VIDEO, COMPUTE AN EDITED PUBLIC SAFETY OFFICIAL SCORE, THE EDITED PUBLIC SAFETY OFFICIAL SCORE BASED ON A SENTIMENT OF THE EDITED VIDEO

335 — COMPUTE A FIRST SCORE, THE FIRST SCORE BASED ON A COMBINATION OF THE CIVILIAN SCORE AND THE PUBLIC SAFETY OFFICIAL SCORE

340 — COMPUTE A SECOND SCORE, THE SECOND SCORE BASED ON A COMBINATION OF THE EDITED CIVILIAN SCORE AND THE EDITED PUBLIC SAFETY OFFICIAL SCORE

345 — COMPARE THE FIRST AND SECOND SCORE TO DETERMINE IF A DIFFERENCE BETWEEN THE SCORES EXCEED A THRESHOLD

350 — RELEASE THE EDITED VIDEO CAPTURING THE PUBLIC SAFETY INCIDENT WHEN THE SCORES DO NOT EXCEED THE THRESHOLD

*FIG. 3*

SYSTEM AND METHOD FOR ELIMINATING BIAS IN SELECTIVELY EDITED VIDEO

BACKGROUND

The use of video cameras is ever increasing. It is quite likely that a person in a public space is having their image recorded by at least one video camera. Public cameras, such as those used to monitor traffic, provide surveillance of sensitive public areas, etc. are becoming ubiquitous. There are also a wide variety of semi-public cameras, such as those used to cover schools, commercial and public buildings, college campuses, corporate campuses, etc. There is even an increase in the number of cameras covering private residences (e.g. doorbell cameras, home security cameras, etc.).

The increase in the use of cameras is even more pronounced in the field of public safety, especially that of law enforcement. A police officer's vehicle may be equipped with multiple cameras (dashboard cameras, etc.) that capture images immediately surrounding the vehicle as well as images from inside the vehicle. Police officers being equipped with Body Worn Cameras is becoming close to universal. Police departments are also beginning to explore drones equipped with cameras as first responders.

Public safety incidents can range from the mundane (e.g. event free traffic stop, etc.) to the extraordinary (e.g. mass shootings, school shootings, etc.). Given the near universal presence of video recording devices, it is highly likely that the incident itself, or at minimum the response to the incident, has been recorded by at least one video recording device. Because the public, in particular the media, may have great interest in understanding what occurred during the incident, requests for any available video may be made. In some cases, any delay in releasing video is looked upon with suspicion.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

FIG. 3 is an example of a flow diagram that may implement the eliminating bias in selectively edited video techniques described herein.

Figure 1:
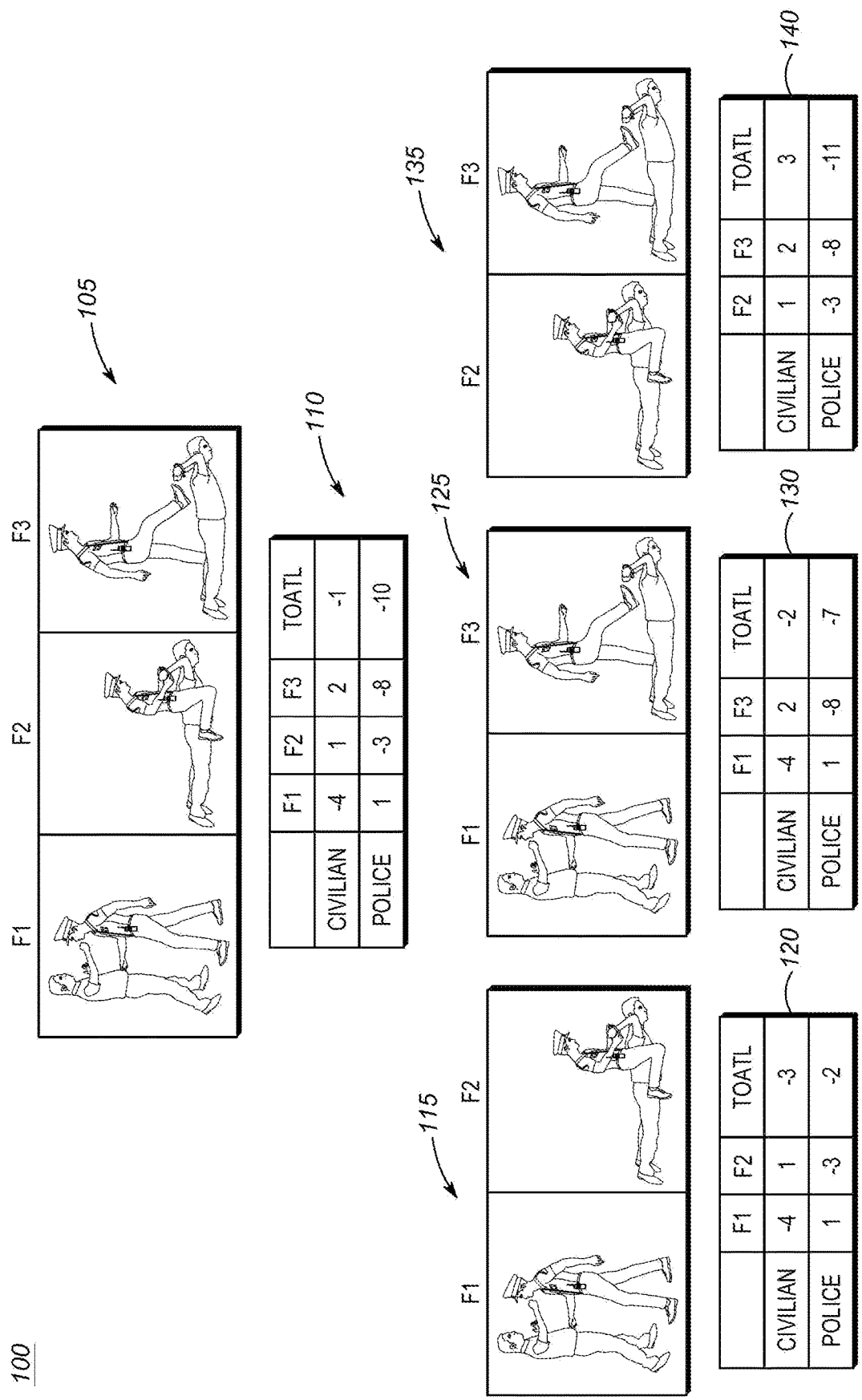
FIG. 1 is an example of a selectively editing video prepared in accordance with the eliminating bias in selectively edited video techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

As mentioned above, when a public safety incident occurs, there are often demands made by the public, in particular the media, that any and all available video footage of the pre-incident conditions, the incident itself, and response to the incident be made available immediately. Any delay in the release may increase the level of suspicion of the video that is eventually provided.

Public safety officials may desire to release any available video as soon as possible, but for various reasons are not able to release the original, unedited video footage. For example, the footage may need to be edited to exclude minors or uninvolved persons. One common technique for editing may be to simply remove portions of the video that contain the subject matter of concern (e.g. cutting out portions of the video that cannot be released, etc.). As yet another example, an incident may span a very long time period (e.g. three hour hostage standoff, etc.). It is likely that the video footage may be edited to include only portions where there is activity and exclude those portions where nothing is happening. Yet another form of editing is redaction. When redacting video, portions of the video may include blocking elements such a black boxes over portions of the video that are not to be released. Other redaction techniques can include blurring subject matter in the videos that are not to be released. The techniques described herein may be utilized with any form of video editing.

A problem arises in that when the video is edited, there can be claims that the video was edited in such a way as to favor one party or the other. For purposes of this disclosure, editing a video means to modify the original video such that the original video is not released. The editing can include removal of portions of the video, redaction of elements within the video, or any other form of editing in which the original video is modified prior to being released. The remainder of the description will be in terms of editing including cutting out portions of the video, but it should be understood that this is for ease of description only. The techniques described herein are applicable to any form of editing. For example, consider a public safety incident captured on video in which a suspect attacks a police officer (e.g. pulls hands away while being handcuffed, takes a fighting stance, etc.) and the police officer responds at first with reasonable force (e.g. assists the suspect to the ground, etc.). The police officer may then use excessive force (e.g. kicks the handcuffed suspect, etc.) that is disproportionate to the initial attack. If the initial attack and initial response are included in the edited video, it would appear the officer's response was reasonable. On the other hand, if the video is edited so as to only include the officer assisting the suspect to the ground, the officer's actions may be considered unreasonable, as there was no reason shown as to why the escalation of use of force was necessary. What should be understood is that depending on how the video was edited, there may be a bias towards one party or the other.

The techniques described herein solve this problem by computing a score for both the unedited and edited video that reflects the overall sentiment of the videos. If the difference in scores exceeds a threshold, it can be determined that the edited video is biased with respect to the unedited video. The original video may be analyzed, and for a civilian captured in the video, behavioral analytics can be used to compute a civilian score, which represents the sentiment of the behavior (e.g. positive, negative, neutral). To provide further granularity, the original video may be divided into a plurality of segments of varying lengths, the lengths based on the change in behavior of the civilian, and each of those segments may be given a civilian score.

The same process may then occur for a public safety official in the original video. The public safety official score represents the sentiment of the behavior. Again, the original video may be segmented to compute a public safety official score for each segment.

The same process of computing a civilian score and a public safety official score for each segment of the unedited video may then be performed on the edited video. As should be clear, the total number of segments in the edited video may be less than the original video as the editing process might remove at least some of the original video. The process would then produce an edited civilian score and an edited public safety official score for each segment of the edited video.

A first score representing a combination of the civilian score and public safety official score for each segment of the original video can be computed. This first score represents the overall sentiment of the original video. A second score representing a combination of the edited civilian score and edited public safety official score for each segment of the edited video can be computed. This second score represents the overall sentiment of the edited video. If the difference between the two scores exceeds a threshold, this indicates that the edited video no longer expresses the same sentiment as the original video and may be considered biased in view of the editing.

If the score comparisons indicate that there may be a bias introduced by the editing, the edited video might not be approved for release. The system may provide suggestions as to how the editing can be done so as to not cause the edited video to appear biased. In some implementations, in addition to the score computing process being conducted by public safety personnel, the process could also be repeated by a trusted authority. The trusted authority could then confirm that the video editing process did not alter the overall sentiment of the original video.

It should further be understood that although the above example was described in terms of a single civilian and a single public safety official in the original video, this was for purposes of ease of description. In an actual implementation, the same process would be followed for each civilian and each public safety official in the video to arrive at an overall sentiment for all participants in the video.

A method is provided. The method includes receiving a request to release a video capturing a public safety incident, editing the video to create an edited video, for at least one civilian captured in the video capturing a public safety incident, computing a civilian score, the civilian score based on a sentiment of the video capturing the public safety incident, for at least one public safety official captured in the video capturing a public safety incident, computing a public safety official score, the public safety official score based on a sentiment of the video capturing the public safety incident, for at least one civilian captured in the edited video, computing an edited civilian score, the edited civilian score based on a sentiment of the edited video, for at least one public safety official captured in the edited video, computing an edited public safety official score, the edited public safety official score based on a sentiment of the edited video, computing a first score, the first score based on a combination of the civilian score and the public safety official score, computing a second score, the second score based on a combination of the edited civilian score and the edited public safety official score, comparing the first and second score to determine if a difference between the scores exceed a threshold, and releasing the edited video capturing the public safety incident when the scores do not exceed the threshold.

In one aspect, computing the civilian score and the public safety official score further comprises, for each civilian or public safety official, analyzing, via an artificial intelligence (AI) bot, a behavior of the civilian or public safety official in the video, segmenting the video into a plurality of fragments based on the AI bot analysis, computing a behavior score for each fragment, wherein the behavior score is based on whether the behavior is positive, negative, or neutral, and computing the civilian score and public safety official score based on the behavior score.

In one aspect, computing the edited civilian score and edited public safety official score further comprises, for each civilian or public safety official, analyzing, via an artificial intelligence (AI) bot, a behavior of the civilian or public safety official in the edited video, segmenting the edited video into a plurality of fragments based on the AI bot analysis, computing a behavior score for each fragment, wherein the behavior score is based on whether the behavior is positive, negative, or neutral, and computing the edited civilian score and edited public safety official score based on the computed behavior score for each fragment.

In one aspect, segmenting the video into the plurality of fragments further comprises, for each civilian and public safety official, creating a new fragment when a change in the behavior score exceeds a behavior score threshold. In one aspect, computing the first and second score further comprises combining, for each civilian and public safety official, the behavior score for each fragment of the video to create a total civilian behavior score and a total public safety official behavior score, to produce the first score and combining, for each civilian and public safety official, the behavior score for each fragment of the edited video to create a total edited civilian behavior score and a total edited public safety official behavior score, to produce the second score.

In one aspect, the behavior score is based on at least one of aggressiveness level, offensiveness level, emotional level, activeness level, and cooperative level. In one aspect, the method further comprises providing editing suggestions to reduce the difference between the first and second scores when the difference exceeds the thresholds, the suggestions including at least one of a suggestion to add one or more fragments to the edited video and a suggestion to delete one or more fragments from the edited video.

A system is provided. The system includes a processor and a memory coupled to the processor. The memory contains thereon a set of instructions that when executed by the processor causes the processor to receive a request to release a video capturing a public safety incident, edit the video to create an edited video, for at least one civilian captured in the video capturing a public safety incident, compute a civilian score, the civilian score based on a sentiment of the video capturing the public safety incident, for at least one public safety official captured in the video capturing a public safety incident, compute a public safety official score, the public safety official score based on a sentiment of the video capturing the public safety incident, for at least one civilian captured in the edited video, compute an edited civilian score, the edited civilian score based on a sentiment of the edited video, for at least one public safety official captured in the edited video, compute an edited public safety official score, the edited public safety official score based on a sentiment of the edited video, compute a first score, the first score based on a combination of the civilian score and the public safety official score, compute a second score, the second score based on a combination of the edited civilian score and the edited public safety official score, compare the first and second score to determine if a difference between the scores exceed a threshold, and release the edited video capturing the public safety incident when the scores do not exceed the threshold.

In one aspect of the system, the instructions to compute the civilian score and the public safety official score further comprises instructions to, for each civilian or public safety official, analyze, via an artificial intelligence (AI) bot, a behavior of the civilian or public safety official in the video, segment the video into a plurality of fragments based on the AI bot analysis, compute a behavior score for each fragment, wherein the behavior score is based on whether the behavior is positive, negative, or neutral, and compute the civilian score and public safety official score based on the behavior score.

In one aspect of the system, the instructions to compute the edited civilian score and edited public safety official score further comprises instructions to, for each civilian or public safety official, analyze, via an artificial intelligence (AI) bot, a behavior of the civilian or public safety official in the edited video, segment the edited video into a plurality of fragments based on the AI bot analysis, compute a behavior score for each fragment, wherein the behavior score is based on whether the behavior is positive, negative, or neutral, and compute the edited civilian score and edited public safety official score based on the computed behavior score for each fragment.

In one aspect of the system, the instructions to segment the video into the plurality of fragments further comprises instructions to, for each civilian and public safety official, create a new fragment when a change in the behavior score exceeds a behavior score threshold. In one aspect of the system, the instructions to compute the first and second score further comprises instructions to combine, for each civilian and public safety official, the behavior score for each fragment of the video to create a total civilian behavior score and a total public safety official behavior score, to produce the first score and combine, for each civilian and public safety official, the behavior score for each fragment of the edited video to create a total edited civilian behavior score and a total edited public safety official behavior score, to produce the second score.

In one aspect of the system, the behavior score is based on at least one of aggressiveness level, offensiveness level, emotional level, activeness level, and cooperative level. In one aspect of the system, the system further comprises instructions to provide editing suggestions to reduce the difference between the first and second scores when the difference exceeds the thresholds, the suggestions including at least one of a suggestion to add one or more fragments to the edited video and a suggestion to delete one or more fragments from the edited video.

A non-transitory processor readable medium is provided. The medium includes a set of instructions thereon that when executed by a processor cause the processor to receive a request to release a video capturing a public safety incident, edit the video to create an edited video, for at least one civilian captured in the video capturing a public safety incident, compute a civilian score, the civilian score based on a sentiment of the video capturing the public safety incident, for at least one public safety official captured in the video capturing a public safety incident, compute a public safety official score, the public safety official score based on a sentiment of the video capturing the public safety incident, for at least one civilian captured in the edited video, compute an edited civilian score, the edited civilian score based on a sentiment of the edited video, for at least one public safety official captured in the edited video, compute an edited public safety official score, the edited public safety official score based on a sentiment of the edited video, compute a first score, the first score based on a combination of the civilian score and the public safety official score, compute a second score, the second score based on a combination of the edited civilian score and the edited public safety official score, compare the first and second score to determine if a difference between the scores exceed a threshold, and release the edited video capturing the public safety incident when the scores do not exceed the threshold.

In one aspect of the medium, the instructions to compute the civilian score and the public safety official score further comprises instructions to, for each civilian or public safety official, analyze, via an artificial intelligence (AI) bot, a behavior of the civilian or public safety official in the video, segment the video into a plurality of fragments based on the AI bot analysis, compute a behavior score for each fragment, wherein the behavior score is based on whether the behavior is positive, negative, or neutral, and compute the civilian score and public safety official score based on the behavior score.

In one aspect of the medium, the instructions to compute the edited civilian score and edited public safety official score further comprises instructions to, for each civilian or public safety official, analyze, via an artificial intelligence (AI) bot, a behavior of the civilian or public safety official in the edited video, segment the edited video into a plurality of fragments based on the AI bot analysis, compute a behavior score for each fragment, wherein the behavior score is based on whether the behavior is positive, negative, or neutral, and compute the edited civilian score and edited public safety official score based on the computed behavior score for each fragment.

In one aspect of the medium, the instructions to segment the video into the plurality of fragments further comprises instructions to, for each civilian and public safety official, create a new fragment when a change in the behavior score exceeds a behavior score threshold. In one aspect of the system, the instructions to compute the first and second score further comprises instructions to combine, for each civilian and public safety official, the behavior score for each fragment of the video to create a total civilian behavior score and a total public safety official behavior score, to produce the first score and combine, for each civilian and public safety official, the behavior score for each fragment of the edited video to create a total edited civilian behavior score and a total edited public safety official behavior score, to produce the second score.

In one aspect of the medium, the medium further comprises instructions to provide editing suggestions to reduce the difference between the first and second scores when the difference exceeds the thresholds, the suggestions including at least one of a suggestion to add one or more fragments to the edited video and a suggestion to delete one or more fragments from the edited video.

Further advantages and features consistent with this disclosure will be set forth in the following detailed description, with reference to the figures.

FIG. 1 is an example of a selectively editing video 100 prepared in accordance with the eliminating bias in selectively edited video techniques described herein. FIG. 1 will be described by way of an example video 105 capturing an interaction between a civilian and a public safety official. For example, the public safety official may be a police officer or some other type of official. Although the description generally proceeds with the public safety official being a law enforcement officer, it should be understood that the techniques herein are not limited to law enforcement only. In addition, the same techniques could be applicable to any situation where it is necessary to edit video prior to release.

The original video 105 may have been video of an incident scene that is captured by a camera. For example, the video may have been captured by a fixed position surveillance camera whose field of view covers the incident location. Other types of cameras may include Pan-Tilt-Zoom (PTZ) surveillance cameras, body worn cameras, dashboard cameras, drone based cameras, personal cameras (e.g. smartphone cameras, etc.), or any other type of camera that may capture an incident scene. The techniques described herein are not limited to any particular camera form factor, so long as it provides the ability to record a video scene.

The video 105 is segmented into three fragments, F1, F2, and F3. The process of segmentation will be described in further detail with respect to FIG. 2. Although the fragments are depicted as still images, it should be understood that this is due to the limitations of what can be included in the drawings. The actual fragments would be sections of moving video. For purposes of ease of explanation of FIG. 1, assume that the fragments are segmented such that the fragments for each person (civilian or public safety official) align with each other.

The first fragment, F1 may include a civilian (e.g. a suspect) interacting aggressively with a police officer. For example, the suspect may be resisting arrest by failing to follow the officer's commands and physically resisting the officer's attempts to take him into custody. As another example, the suspect's behavior may be even more aggressive, such as attacking the officer by hitting the officer, with or without a weapon. In this example fragment F1, the officer is not acting aggressively toward the suspect.

The second fragment, F2 may include the public safety official using a reasonable amount of force to subdue the suspect. For example, a police officer may assist the suspect to the ground in order to gain control of the suspect by handcuffing the suspect. For purposes of this example, assume that the suspect is not resisting, and is not being aggressive.

The third fragment, F3 may include the suspect having been fully restrained in handcuffs and being cooperative. The officer may have been captured using excessive force by assaulting the subdued suspect. For example, the officer may have kicked the subdued suspect, with no apparent provocation.

In order to establish a baseline of the sentiment of the overall video, each entity (e.g. the civilian and the officer) in each fragment will have a score calculated that will be referred to as the civilian score or public safety official score for the unedited video. There are many video analytics techniques available that can be used to identify individuals in a scene and assign a score indicating if their behavior is aggressive (e.g. negative behavior), non-aggressive (e.g. positive behavior), or neutral. The techniques described herein are not dependent on any particular technique and are suitable for use with any currently available or later developed behavioral analysis analytic.

As shown in table 110, for each fragment of the video, the civilian and the Police are given a score based on the aggressiveness level displayed. As shown, for fragment F1, the civilian was exhibiting negative behavior toward the officer by resisting and was assigned a score of −4. The more aggressive the behavior, the lower the score may be. For the police, there was initially no aggressive behavior in fragment F1, so the score may be a positive value, such as 1.

As shown in table 110, for fragment F2, the score for the civilian may be a 1 because the civilian is complying with the officer's instructions and is being cooperative while being taken into custody. The officer's score on the other hand may be a −3, because the officer is exhibiting reasonably aggressive behavior in arresting the suspect. It should be understood that in the context of public safety, in some instances, aggressive behavior on the part of public safety officials is not only warranted but is actually expected.

As shown in table 110, for fragment F3, the civilian may be passive because he is fully restrained and in custody, thus resulting in a score of 2, indicating the suspect is being passive. In fragment F3, the officer may exhibit extreme aggressiveness by physically assaulting an in custody suspect. In this example, the aggressiveness score may be a −8.

The scores for each of the entities (e.g. the civilian and the officer) for the unedited video may be computed. For example, the computations may be as simple as adding the scores for each fragment together. Using this example calculation, the total score for the civilian as shown in table 110 is −1, while the total score for the officer is −10. Although addition is used as the computation method in this example, it should be understood that other techniques could also be used. For example, subtraction, an average may be calculated, different weights may be given to the scores, a maximum or minimum value may be used, etc. What should be understood is that a score reflective of the aggressiveness of both the civilian and officer for the unedited video is determined.

This total score can be considered the sentiment of the unedited video from the perspective of each of the civilian and police officer. As shown in table 110, the civilian total score for the unedited video is a −1, indicating a low degree of aggressive behavior, while the score for the police is a −10, indicating a much greater degree of aggressiveness on behalf of the officer.

Although specific numerical values have been assigned to the behavior of the civilian and the officer, it should be understood that the numbers themselves are not particularly important. As will be explained in further detail below with respect to the editing process, it is the scores relative to other scores that is used to determine if the edited video exhibits bias relative to the unedited video.

The total score for the civilian and the officer may then be combined to compute a first score for the unedited video. The first score may be computed in any number of ways. For example, the first score may simply be subtracting the total score for each of the civilian and the police officer together. In this example, the first score may be 9, obtained by subtracting the total score of the police officer from the total score of the civilian. The first score may be reflective of the overall sentiment of the unedited video. Again, it should be understood that using subtraction to calculate the first score is only one possible computation method. Other methods may include addition, averaging, maximum value, minimum value, etc., or the combination thereof. What should be understood is that the same techniques used for computing the scores for the unedited video are also used to compute scores for the edited video, thus ensuring an apples to apples comparison when comparing the sentiment of the unedited videos to the edited videos. It should also be understood that each of the scores may be weighted based on the order of the fragments, as the order of events may be useful in determining who provoked the violent or offensive behavior.

Although FIG. 1 is shown as a single officer and single civilian, it should be understood that this was for ease of description only. In an actual implementation, there may be multiple civilians and officers within a video. A score reflecting the sentiment for each officer and civilian may be computed. The scores for the officers may be combined to compute an overall score for all officers and the same process could occur to compute an overall score for all civilians. The two scores may then be combined to reflect the overall sentiment of the video with respect to all participants.

As explained above, in some cases, the full video 105 may not be released to the public but instead an edited version is released. FIG. 1 depicts three example edited videos. In edited video 115, fragment F3 (officer using excessive force) is cut from the released video. In edited video 125, fragment F2 (officer using reasonable force) is omitted. In edited video 135, fragment F1 (suspect attacking officer) is omitted.

For each of the edited videos, a second score, which reflects the overall sentiment of the edited video is calculated. The process used is the same as that which was used for calculating the overall sentiment of the unedited video. For example, for edited video 115, the scores for fragments F1 and F2 are obtained from table 110 and placed into table 120. The total scores can then be calculated. In this case, the total scores are −3 for the civilian and −2 for the officer. The overall sentiment of edited video 115 can then be computed by subtracting the total scores, with a result of −1.

The same process that was used to calculate the sentiment score for edited video 115 can then be used on the other two edited videos. As shown, for edited video 125, the scores for fragments F1 and F3 are transferred into table 130, the total scores of −2 for the civilian and −7 for the police officer are calculated, and an overall score of 5 for edited video 125 can be calculated. For edited video 135, the scores for fragments F2 and F3 are transferred into table 140, the civilian score of 3 and police officer score of −11 are calculated, and an overall score of 14 for edited video 135 may be determined.

The overall sentiment score for each edited video may then be compared to determine if the overall sentiment of the edited video has significantly changed from the unedited video. In this example, the unedited video had an overall sentiment score of 9. Edited video 115 had an overall score of −1, edited video 125 had an overall score of 5, and edited video 135 had an overall score of 14.

In this example, it is clear that edited video 115 with an overall score of −1 when compared to the 9 score from the unedited video clearly shows significant deviation indicating that the edited video is biased. From a conceptual point of view this should be clear, as the portion of the video showing the officer at his most aggressive (e.g. fragment F3) has been omitted. Releasing such a video would reflect editing that shows a bias in favor of one party or the other.

Edited videos 125 and 135 with respective overall scores of 5 and 14 are much closer to the 9 score of the unedited video. In an ideal world, the video would continue to be edited by refining the fragments to the point where the sentiment of the unedited video is the same as that of the edited video. However, given the desire to release video as soon as possible, a threshold value may be identified to allow edited video that is sufficiently close in sentiment to the unedited video to be released. For example, in the present example, the threshold may be set at four, such that if the edited video has an overall sentiment score that is within four units from the unedited video, the video may be released. In this case, the edited video 125 has a sentiment score of 5 which is within four units of the 9 of the unedited video, and can thus be released. The edited video 135 with a sentiments score of 14, which is greater than four units from the 9 of the unedited video would not be released as it would deviate from the unedited threshold by an amount greater than the threshold. What should be understood is that the configurable threshold allows the system to determine the level of bias that is allowed to be introduced when releasing edited video.

Figure 5:
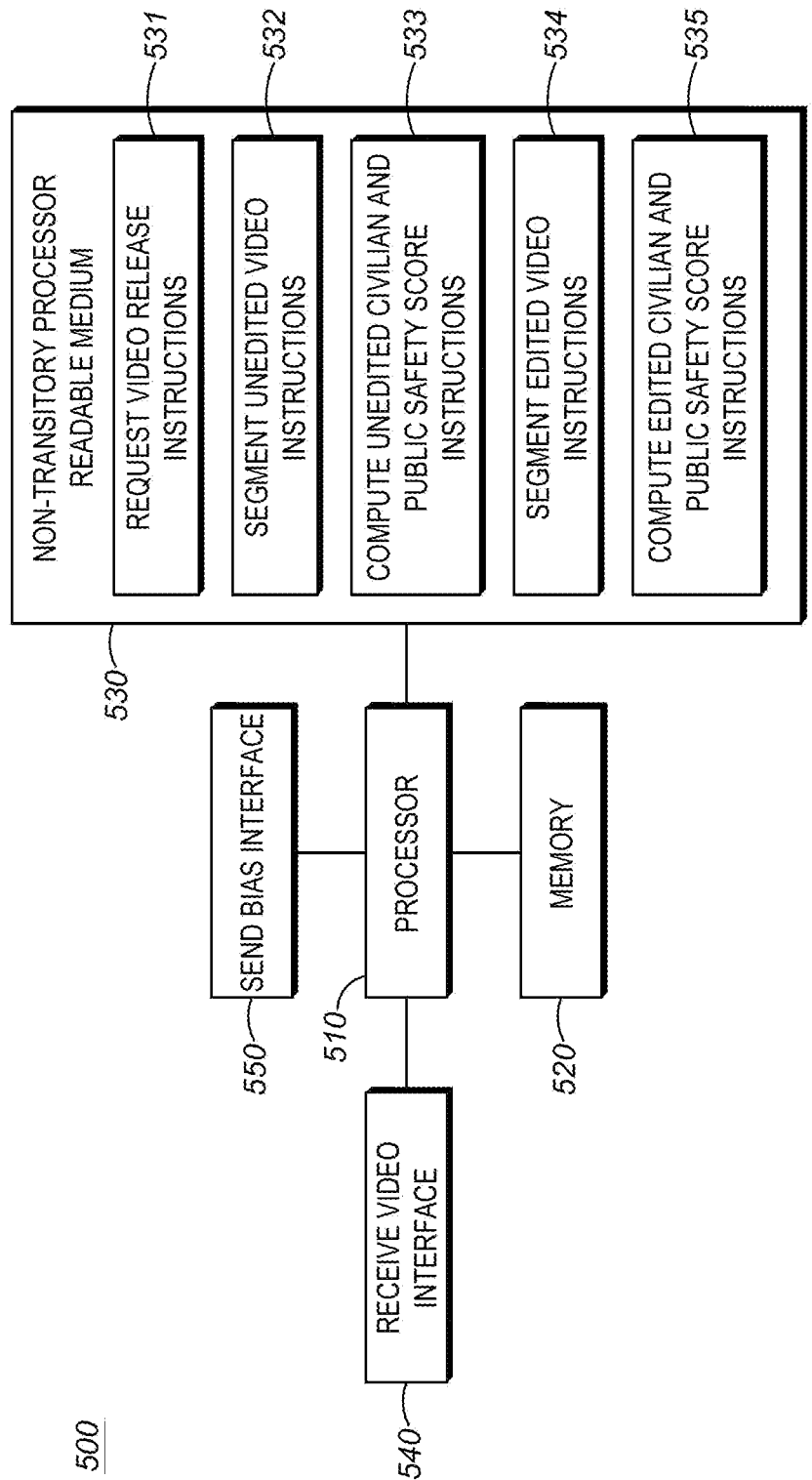
FIG. 5 is an example of a device that may implement the eliminating bias in selectively edited video techniques described herein.

The process described with respect to FIG. 1 would likely occur entirely with a public safety agency that has control over the unedited video using a computing device such as the one depicted in FIG. 5. A skeptical public and or media may not trust the public safety agency when the agency says the level of bias between the edited and unedited videos is below a threshold. In order to alleviate these concerns, the unedited and edited video may be sent to a trusted third party (not shown) equipped with similar hardware and the same software used by the public safety agency to independently confirm that the level of bias in the edited video is within the threshold. Because an independent third party has calculated the bias level, using the same techniques, there can be greater confidence that the public safety agency is being truthful with respect to the amount of bias in the edited video.

Figure 2:
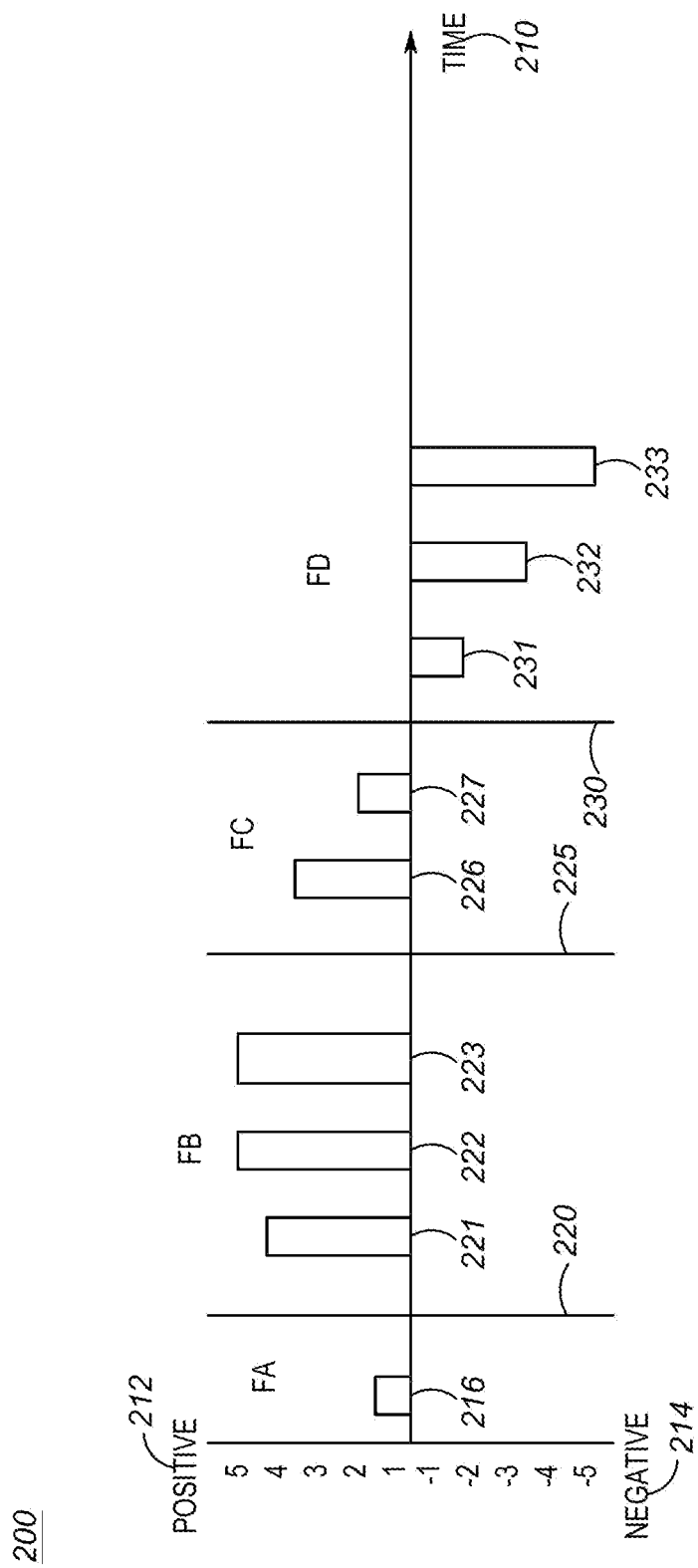
FIG. 2 is an example of segmenting video in accordance with the eliminating bias in selectively edited video techniques described herein.

FIG. 2 is an example of segmenting video 200 in accordance with the eliminating bias in selectively edited video techniques described herein. As mentioned above, for each participant, the overall video will be segmented into multiple fragments, and each fragment will be given a score. The system may determine the segmentation by using behavioral analytics to calculate a score (e.g. aggressiveness level) for the video being displayed. In one implementation, the fragment boundaries may be determined when there is a change in the behavioral score that exceeds a threshold or that indicates a rate of change in score that is significant.

In the example shown in FIG. 2, there is a timeline 210 that depicts playback of the video (either edited or unedited). For each participant, as the video is played, behavioral analytics computes a score, either positive 212, which indicates less aggressive behavior or negative 214 which indicates more aggressive behavior. In the example, up until time marked by the line 220, the current entity is exhibiting slightly positive behavior as shown by score 216. As long as this behavior continues, the fragment continues.

At point 225 on the timeline, it can be seen that the score 221 rises significantly compared to the previous score. Such a change may indicate a change in behavior that is substantive enough to warrant creation of a new fragment. As shown, the previous fragment, from the initial time to time marked at 220 is now labeled fragment FA, and a new fragment is started.

The process continues to analyze the video to determine if the behavior score remains generally the same. As shown, scores 222 and 223 are generally the same as score 221, and as such the fragment continues. The score depicted at 226 shows a significant decrease, and as such, the previous fragment, labeled FB is closed, and a new fragment FC is begun at 225.

Thus far, the fragments have all been on the positive side of the behavior score and variances in the scores not exceeding a threshold are used to determine when a new fragment is started. For example, the score 227 is sufficiently close to the score 226 that a new fragment is not started.

However, when a behavior score shifts from positive to negative, this may trigger the creation of a new fragment. For example, the magnitude of the difference in scores between score 227 and score 231 may be similar to that of the difference between scores 226 and 227 (which did not cause a new fragment to be created). Because the score 227 is positive and the score 231 is negative, this indicates a change in the overall sentiment of the behavior (e.g. went from positive behavior to negative behavior). As such, this change may be deemed significant and at 230, the previous fragment FC may be closed, and the next fragment FD may begin. As long as scores 232 and 233 do not significantly deviate, fragment FD will continue.

What should be understood is that this process may occur multiple times, once for each entity in the video. Thus for each person a score is calculated and that score is used when calculating the overall sentiment score of the edited and unedited video.

FIG. 3 is an example of a flow diagram 300 that may implement the eliminating bias in selectively edited video techniques described herein. In block 305, a request to release a video capturing a public safety incident may be received. For example, a public safety information officer may have a video of an incident scene that they wish to distribute to the public. The original, unedited video, may be input into the system to serve as a baseline for determining a bias level of any edited video.

In block 310, the video may be edited to create an edited video. As explained above, in many cases there are portions of the original video that cannot be released for various reasons (e.g. depicts minors, uninvolved persons, etc.). In some cases, the video may be edited to remove tedious or repetitive portions (e.g. extended hostage situation, etc.). Regardless of the reason, in many cases editing the video to simply remove the portions that cannot be released is the fastest way to produce a video that can be released to the public. As explained above, other techniques exist to prevent such release (e.g. redaction, etc. The techniques described herein could be utilized with any form of editing the video, including the use of redaction.

Although block 310 recites that the video is edited, it should be understood that this does not mean the editing is necessarily done within the bias determination system. Editing the video to prevent the release of sensitive information can also mean that a video that has been edited outside of the bias determination system could be received.

In block 315, for at least one civilian captured in the video capturing a public safety incident, a civilian score may be computed. The civilian score may be based on a sentiment of the video capturing the public safety incident. It should be understood that there may be many civilians depicted with the video (e.g. the unedited video), and a civilian score may be calculated for all of them. The calculation of the civilian score is described in further detail with respect to FIG. 4.

In block 320, for at least one public safety official captured in the video capturing a public safety incident, a public safety official score may be computed. The public safety official score may be based on a sentiment of the video capturing the public safety incident. It should be understood that there may be many public safety officials depicted with the video (e.g. the unedited video), and a public safety official score may be calculated for all of them. The calculation of the public safety official score is described in further detail with respect to FIG. 4.

In block 325, for at least one civilian captured in the edited video, an edited civilian score may be calculated. The edited civilian score based on a sentiment of the edited video. The process in block 325 is effectively the same as that shown with respect to block 315, with the exception that the edited video is used instead of the original, unedited video.

In block 330, for at least one public safety official captured in the edited video, an edited public safety official score may be computed. The edited public safety official score may be based on a sentiment of the edited video. The process in block 330 is effectively the same as that shown with respect to block 320, with the exception that the edited video is used instead of the original, unedited video.

In block 335, a first score may be computed. The first score may be based on a combination of the civilian score and the public safety official score. As explained above, the particular combination technique used is relatively unimportant. In some cases, the combination may be a simple subtraction of the scores. Other techniques (e.g. addition, averaging, minimum value, maximum value, etc.) of the scores may be used to create the first score. Regardless of the technique used, what should be understood is that the same combination technique is used when generating the second score, as described below in block 340.

In block 340, a second score may be computed. The second score may be based on a combination of the edited civilian score and the edited public safety official score. The process in block 340 is effectively the same as the process in block 335 with the exception that the edited video is used instead of the original, unedited video. As explained above, the particular form of the combination technique used is unimportant, so long as the same technique is used when calculating both the first and second scores.

In block 345, the first and second score may be compared to determine if a difference between the scores exceeds a threshold. As explained above, the comparison of the first and second score may be used to determine if the overall sentiment of the edited video deviates significantly from the original, unedited video, which could be an indication that the edited video is biased in favor of a civilian or a public safety official. The specific form of the comparison is relatively unimportant. In one implementation, the comparison could involve simply subtracting the second score from the first. Any number of other comparison techniques (e.g. addition, averaging, minimum value, maximum value, etc.).

The use of a threshold allows a public safety official to determine how much bias in the edited video is acceptable. The threshold may be set to not allow any bias or to allow complete bias in favor of one party, or anywhere in between. Different public safety agencies may have different levels of bias that are deemed acceptable, and use of the threshold, which may be configurable, would allow the agency to determine the acceptable level of bias.

In block 350, the edited video capturing the public safety incident may be released when the scores do not exceed the threshold. Release of the edited video does not necessarily mean the edited video is directly released by the bias elimination system. In some cases, the release could mean that the system provides the result of the comparison to the threshold, and a human operator decides if the edited video should be released or not. In some cases, releasing the video may simply include providing an indication that the edited video is approved for release because the comparison fell below the threshold.

Figure 4:
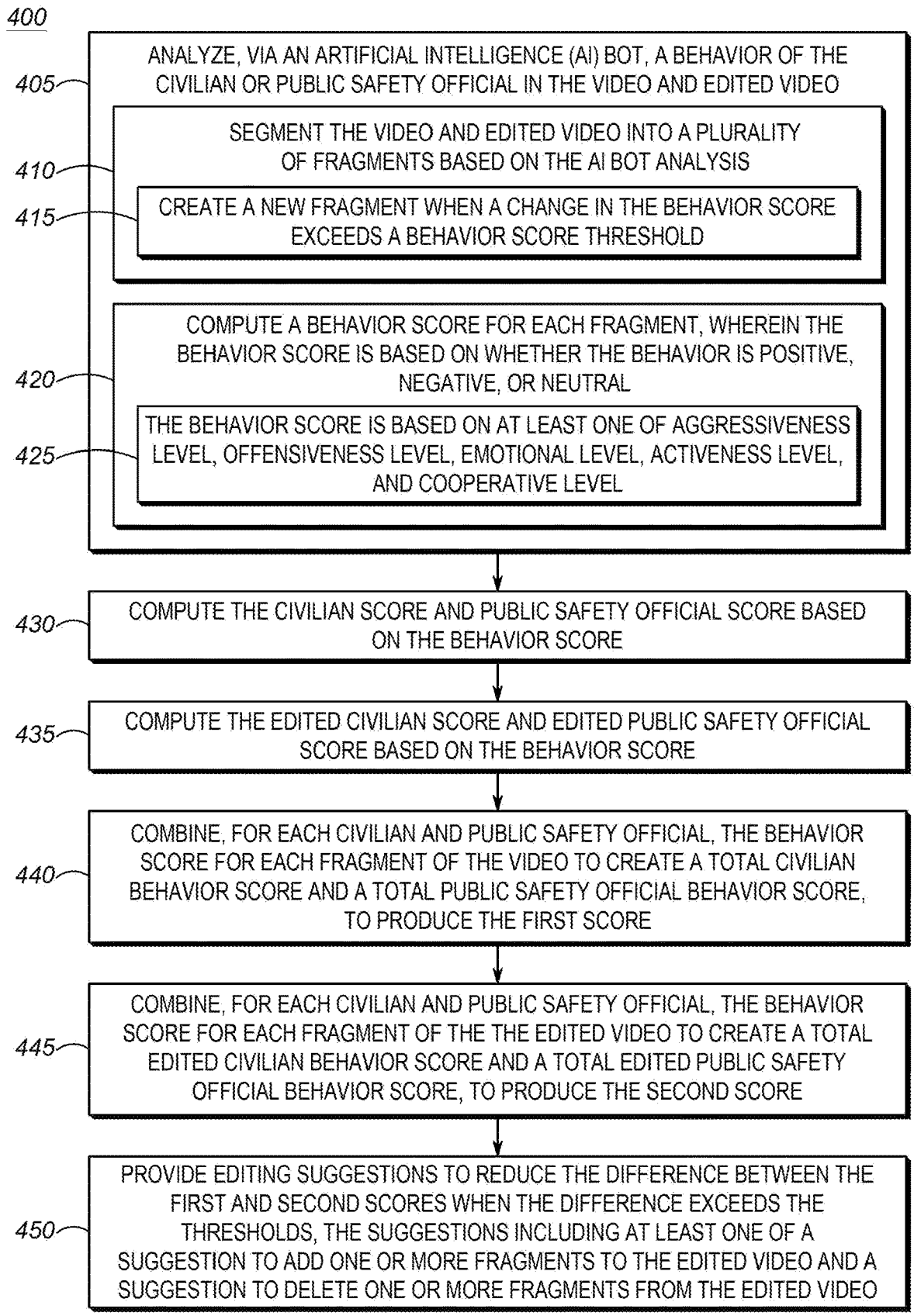
FIG. 4 is an example of a flow diagram, including additional details, that may implement the eliminating bias in selectively edited video techniques described herein.

FIG. 4 is an example of a flow diagram 400, including additional details, that may implement the eliminating bias in selectively edited video techniques described herein. As explained above, FIG. 4 will describe in further detail the techniques used to segment the edited and original unedited video and assign scores based on video analytics performed by an AI Bot.

In block 405, a behavior of the civilian or public safety official in the video and in the edited video may be analyzed via an artificial intelligence (AI) bot for each civilian and public safety official in each of the video and the edited video. This analysis may be done for each civilian and public safety official that appears in the video and the edited video. The analysis may include using behavioral analytics to identify a behavior. There are many known behavioral analytics techniques that may be used to identify behavior. The techniques described herein are not dependent on any particular technique and can be used with any currently available or later developed behavioral analytic technique.

In block 410, the video and the edited video may be segmented into a plurality of fragments based on the AI bot analysis. As described above with respect to FIG. 2, the segmentation may be determined based on changes in the behavior score increasing or decreasing by a significant amount, or by changes in the behavior from a positive to a negative behavior. As shown in block 415, a new fragment may be created when a change in the behavior score exceeds a behavior score threshold. The threshold may be defined to produce a more segmented video by setting the threshold to be low (e.g. minor changes in behavior score cause new fragments to be generated) or may be set higher to cause fewer segments to be generated (e.g. new fragments do not begin until a large variance from the previous behavior score occur).

In block 420, a behavior score for each fragment may be computed. The behavior score is based on whether the behavior is positive, negative, or neutral. The behavior score may be a quantified factor for each civilian or public safety official in each fragment in the video and the edited video. In block 425, it is shown that the behavior score may be based on many different factors, including at least one of aggressiveness level, offensiveness level, emotional level, activeness level, and cooperative level.

Aggressiveness level has been described above. Offensiveness level may include determining if a behavior would be considered offensive to a reasonable person (e.g. spitting, swearing, etc.) even if not directly considered physically aggressive. Emotional level may include determining if a person is behaving rationally or not, crying, angry, etc. Activeness level can include how passive or active a person is. A passive person for example may make no movements, either helpful or unhelpful. An active person may be actively resisting or may be actively cooperating. Cooperative may include if a person is trying to cooperate with an officer or is being intentionally uncooperative. It should be understood that these are simply examples of factors that could be used to create a behavior score. The techniques described herein are not limited to these factors.

In block 430, the civilian score and public safety official score may be computed based on the behavior score. In other words, all of the behavior scores for all of the civilians and all of the public safety officials in the original unedited video may be computed. As explained above, the computation may simply be an addition of all the scores for each civilian and for each public safety official. It should be understood that the techniques described herein are not limited to addition only.

In block 435, the edited civilian score and edited public safety official score may be computed based on the behavior score. The operation in block 435 is effectively the same as that within block 430, with the exception that the edited video is used, rather than the original unedited video.

In block 440, for each civilian and public safety official the behavior score for each fragment of the video may be combined to create a total civilian behavior score and a total public safety official behavior score, to produce the first score. In other words, the first score, which is the score for the unedited video is created by combining the fragment scores for all of the entities that appear in the original unedited video.

In block 445, for each civilian and public safety official the behavior score for each fragment of the video may be combined to create a total edited civilian behavior score and a total edited public safety official behavior score, to produce the second score. The operation of block 445 is generally the same as that of block 440, with the exception that the combination is done for scores of the edited video, rather than the original unedited video.

In block 450, editing suggestions may be provided to reduce the difference between the first and second scores when the difference exceeds the thresholds. The suggestions may include at least one of a suggestion to add one or more fragments to the edited video and a suggestion to delete one or more fragments from the edited video. Because the techniques described herein calculate behavior scores for every fragment within the original video, it may be determined which fragments have scores that are the most influential (e.g. highest) on the determination of an edited video being biased. The system may make suggestions to include fragments that are biased in the opposite direction to overcome an edited video that is shown to be biased. The same process may occur for suggestions to remove overly biased fragments.

FIG. 5 is an example of a device that may implement the eliminating bias in selectively edited video techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. video analytics, audio analytics, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, receive video interface 540, and send bias information interface 550.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include request video release instructions 531. The request video release instructions 531 may cause the processor to receive a request to evaluate unedited and edited video for the presence of bias in the edited video as part of a release of video to the public. For example, the processor may receive both unedited and edited video via the receive video interface 540, which can be a connection to any type of storage for video files. In some cases, the request video release instructions 531 may also include instructions for how to edit the video.

The request video release instructions 531 may also include evaluating the various scores to determine if the edited video exhibits biased when compared to the unedited video. The request video release instructions 531 may also cause the processor to provide suggestions as to how to make the edited video less biased with respect to the unedited video. The output from the processor determining if the edited video is biased or providing suggestions to make the edited video less biased may be provided to the user via a send bias information interface 550, which may be, for example, a display device. The request video release instructions 531 are described throughout this description generally, including places such as the description of blocks 305, 310, 345, 350, and 450.

The medium 530 may include segment unedited video instructions 532. The segment unedited video instructions 532 may cause the processor to take the unedited video received from the receive video interface 540 and segment that video for each entity depicted in the unedited video. The segment unedited video instructions 532 may cause the processor to segment the video based on changes in behavior identified using behavior analytics tools for each participant in the video. The segment unedited video instructions 532 are described throughout this description generally, including places such as the description of blocks 405-425.

The medium 530 may include compute unedited civilian and public safety score instructions 533. The compute unedited civilian and public safety score instructions 533 may cause the processor to compute an overall sentiment score for the unedited video by using the scores calculated during the segmentation process. The compute unedited civilian and public safety score instructions 533 are described throughout this description generally, including places such as the description of blocks 315, 320, 335, 430, and 440.

The medium 530 may include segment edited video instructions 534. The segment edited video instructions 534 may cause the processor to take the edited video received from the receive video interface 540 and segment that video for each entity depicted in the edited video. The segment edited video instructions 534 may cause the processor to segment the video based on changes in behavior identified using behavior analytics tools for each participant in the edited video. The segment edited video instructions 534 are described throughout this description generally, including places such as the description of blocks 405-425.

The medium 530 may include compute edited civilian and public safety score instructions 535. The compute edited civilian and public safety score instructions 535 may cause the processor to compute an overall sentiment score for the edited video by using the scores calculated during the segmentation process. The compute edited civilian and public safety score instructions 535 are described throughout this description generally, including places such as the description of blocks 325, 330, 340, 435, and 445.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot segment video and perform computer implemented behavioral analytics to calculate a sentiments score for edited and unedited video, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving a request to release a video capturing a public safety incident;
   editing the video to create an edited video;
   for at least one civilian captured in the video capturing a public safety incident, computing a civilian score, the civilian score based on a sentiment of the video capturing the public safety incident;

for at least one public safety official captured in the video capturing a public safety incident, computing a public safety official score, the public safety official score based on a sentiment of the video capturing the public safety incident;

for at least one civilian captured in the edited video, computing an edited civilian score, the edited civilian score based on a sentiment of the edited video;

for at least one public safety official captured in the edited video, computing an edited public safety official score, the edited public safety official score based on a sentiment of the edited video;

computing a first score, the first score based on a combination of the civilian score and the public safety official score;

computing a second score, the second score based on a combination of the edited civilian score and the edited public safety official score;

comparing the first and second score to determine if a difference between the scores exceed a threshold; and releasing the edited video capturing the public safety incident when the scores do not exceed the threshold.

2. The method of claim 1 wherein computing the civilian score and the public safety official score further comprises:
for each civilian or public safety official:
analyzing, via an artificial intelligence (AI) bot, a behavior of the civilian or public safety official in the video;
segmenting the video into a plurality of fragments based on the AI bot analysis;
computing a behavior score for each fragment, wherein the behavior score is based on whether the behavior is positive, negative, or neutral; and
computing the civilian score and public safety official score based on the behavior score.

3. The method of claim 2 wherein computing the edited civilian score and edited public safety official score further comprises:
for each civilian or public safety official:
analyzing, via an artificial intelligence (AI) bot, a behavior of the civilian or public safety official in the edited video;
segmenting the edited video into a plurality of fragments based on the AI bot analysis;
computing a behavior score for each fragment, wherein the behavior score is based on whether the behavior is positive, negative, or neutral; and
computing the edited civilian score and edited public safety official score based on the computed behavior score for each fragment.

4. The method of claim 2 wherein segmenting the video into the plurality of fragments further comprises:
for each civilian and public safety official:
creating a new fragment when a change in the behavior score exceeds a behavior score threshold.

5. The method of claim 2 wherein computing the first and second score further comprises:
combining, for each civilian and public safety official, the behavior score for each fragment of the video to create a total civilian behavior score and a total public safety official behavior score, to produce the first score; and
combining, for each civilian and public safety official, the behavior score for each fragment of the edited video to create a total edited civilian behavior score and a total edited public safety official behavior score, to produce the second score.

6. The method of claim 2 wherein the behavior score is based on at least one of aggressiveness level, offensiveness level, emotional level, activeness level, and cooperative level.

7. The method of claim 3 further comprising:
providing editing suggestions to reduce the difference between the first and second scores when the difference exceeds the thresholds, the suggestions including at least one of a suggestion to add one or more fragments to the edited video and a suggestion to delete one or more fragments from the edited video.

8. A system comprising:
a processor; and
a memory coupled to the processor, the memory containing thereon a set of instructions that when executed by the processor cause the processor to:
receive a request to release a video capturing a public safety incident;
edit the video to create an edited video;
for at least one civilian captured in the video capturing a public safety incident, compute a civilian score, the civilian score based on a sentiment of the video capturing the public safety incident;
for at least one public safety official captured in the video capturing a public safety incident, compute a public safety official score, the public safety official score based on a sentiment of the video capturing the public safety incident;
for at least one civilian captured in the edited video, compute an edited civilian score, the edited civilian score based on a sentiment of the edited video;
for at least one public safety official captured in the edited video, compute an edited public safety official score, the edited public safety official score based on a sentiment of the edited video;
compute a first score, the first score based on a combination of the civilian score and the public safety official score;
compute a second score, the second score based on a combination of the edited civilian score and the edited public safety official score;
compare the first and second score to determine if a difference between the scores exceed a threshold; and
release the edited video capturing the public safety incident when the scores do not exceed the threshold.

9. The system of claim 8 wherein the instructions to compute the civilian score and the public safety official score further comprises instructions to:
for each civilian or public safety official:
analyze, via an artificial intelligence (AI) bot, a behavior of the civilian or public safety official in the video;
segment the video into a plurality of fragments based on the AI bot analysis;
compute a behavior score for each fragment, wherein the behavior score is based on whether the behavior is positive, negative, or neutral; and
compute the civilian score and public safety official score based on the behavior score.

10. The system of claim 9 wherein the instructions to compute the edited civilian score and edited public safety official score further comprises instructions to:
for each civilian or public safety official:
analyze, via an artificial intelligence (AI) bot, a behavior of the civilian or public safety official in the edited video;

segment the edited video into a plurality of fragments based on the AI bot analysis;

compute a behavior score for each fragment, wherein the behavior score is based on whether the behavior is positive, negative, or neutral; and compute the edited civilian score and edited public safety official score based on the computed behavior score for each fragment.

11. The system of claim 9 wherein the instructions to segment the video into the plurality of fragments further comprises instructions to:

for each civilian and public safety official:
create a new fragment when a change in the behavior score exceeds a behavior score threshold.

12. The system of claim 9 wherein the instructions to compute the first and second score further comprises instructions to:

combine, for each civilian and public safety official, the behavior score for each fragment of the video to create a total civilian behavior score and a total public safety official behavior score, to produce the first score; and combine, for each civilian and public safety official, the behavior score for each fragment of the edited video to create a total edited civilian behavior score and a total edited public safety official behavior score, to produce the second score.

13. The system of claim 9 wherein the behavior score is based on at least one of aggressiveness level, offensiveness level, emotional level, activeness level, and cooperative level.

14. The system of claim 10 further comprising instructions to:

provide editing suggestions to reduce the difference between the first and second scores when the difference exceeds the thresholds, the suggestions including at least one of a suggestion to add one or more fragments to the edited video and a suggestion to delete one or more fragments from the edited video.

15. A non-transitory processor readable medium containing a set of instructions thereon that when executed by a processor cause the processor to:

receive a request to release a video capturing a public safety incident;

edit the video to create an edited video;

for at least one civilian captured in the video capturing a public safety incident, compute a civilian score, the civilian score based on a sentiment of the video capturing the public safety incident;

for at least one public safety official captured in the video capturing a public safety incident, compute a public safety official score, the public safety official score based on a sentiment of the video capturing the public safety incident;

for at least one civilian captured in the edited video, compute an edited civilian score, the edited civilian score based on a sentiment of the edited video;

for at least one public safety official captured in the edited video, compute an edited public safety official score, the edited public safety official score based on a sentiment of the edited video;

compute a first score, the first score based on a combination of the civilian score and the public safety official score;

compute a second score, the second score based on a combination of the edited civilian score and the edited public safety official score;

compare the first and second score to determine if a difference between the scores exceed a threshold; and release the edited video capturing the public safety incident when the scores do not exceed the threshold.

16. The medium of claim 15 wherein the instructions to compute the civilian score and the public safety official score further comprises instructions to:

for each civilian or public safety official:
analyze, via an artificial intelligence (AI) bot, a behavior of the civilian or public safety official in the video;

segment the video into a plurality of fragments based on the AI bot analysis;

compute a behavior score for each fragment, wherein the behavior score is based on whether the behavior is positive, negative, or neutral; and compute the civilian score and public safety official score based on the behavior score.

17. The medium of claim 16 wherein the instructions to compute the edited civilian score and edited public safety official score further comprises instructions to:

for each civilian or public safety official:
analyze, via an artificial intelligence (AI) bot, a behavior of the civilian or public safety official in the edited video;

segment the edited video into a plurality of fragments based on the AI bot analysis;

compute a behavior score for each fragment, wherein the behavior score is based on whether the behavior is positive, negative, or neutral; and compute the edited civilian score and edited public safety official score based on the computed behavior score for each fragment.

18. The medium of claim 16 wherein the instructions to segment the video into the plurality of fragments further comprises instructions to:

for each civilian and public safety official:
create a new fragment when a change in the behavior score exceeds a behavior score threshold.

19. The medium of claim 16 wherein the instructions to compute the first and second score further comprises instructions to:

combine, for each civilian and public safety official, the behavior score for each fragment of the video to create a total civilian behavior score and a total public safety official behavior score, to produce the first score; and combine, for each civilian and public safety official, the behavior score for each fragment of the edited video to create a total edited civilian behavior score and a total edited public safety official behavior score, to produce the second score.

20. The medium of claim 17 further comprising instructions to:

provide editing suggestions to reduce the difference between the first and second scores when the difference exceeds the thresholds, the suggestions including at least one of a suggestion to add one or more fragments to the edited video and a suggestion to delete one or more fragments from the edited video.

* * * * *